United States Patent Office 2,900,385
Patented Aug. 18, 1959

2,900,385

DIHYDROTRIAZINES AND METHOD OF MANUFACTURE

Edward J. Modest, Newton Center, Mass., assignor to Children's Cancer Research Foundation, Inc., Boston, Mass., a corporation of Massachusetts No Drawing. Application July 10, 1956
Serial No. 596,822

2 Claims. (Cl. 260—249.9)

This invention relates to new compositions of matter and to a method of producing the same and pertains more specifically to certain dihydrotriazine free bases and their corresponding salts which are useful as intermediates in organic synthesis. In addition, many of the dihydrotriazines and salts of the present invention exhibit pronounced biological activity, including anti-malarial and anti-vitamin activity, as well as activity against toxoplasmosis in mice and coccidiosis in chicks. The method of the present invention involves a three-component synthesis in which a primary arylamine is caused to react with a dicyandiamide and with either an aldehyde or a ketone.

The dihydrotriazines made by the method of the present invention may be designated by the following generic structural formula:

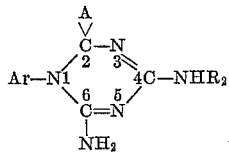

in which Ar represents an aromatic carbocyclic group having the connecting valence on a ring carbon atom, $R_2$ represents hydrogen, an aliphatic group having up to 12 carbon atoms, or an aromatic carbocyclic group having up to 12 carbon atoms and up to two rings, and A represents either (1) two aliphatic groups, preferably aliphatic hydrocarbon or alkyl groups, containing together up to 6 carbon atoms, (2) a cycloaliphatic group, preferably a cycloalkylene group, designated —$(CH_2)_n$—, containing up to 8 carbon atoms in the ring, preferably no more than 6 carbon atoms, (3) a hydrogen atom and an aromatic carbocyclic group containing up to 25 carbon atoms and up to three rings and having the connecting valence on a ring carbon atom, preferably a hydrogen atom and an aromatic carbocyclic group containing up to two rings and containing no substituent groups other than alkyl groups having up to 6 carbon atoms with the total number of carbon atoms not exceeding 15, or (4) a hydrogen atom and an aliphatic hydrocarbon group.

All of the aromatic carbocyclic groups of the foregoing compounds may contain, one, two, or three rings and may have one or more ring hydrogen atoms replaced by a monovalent substituent such as alkyl, alkoxy, carboxy, halo, sulfo, cyano, nitro, etc., groups. The preferred class of compounds includes only those having the above structure in which $R_2$ is hydrogen or a hydrocarbon group containing up to 12 carbon atoms, either an aliphatic group or an aromatic group containing up to two rings, and the portion of the molecule denoted by the symbol Ar is an aromatic carbocyclic group containing not more than two rings, preferably only one ring, and having a total of not more than 12 carbon atoms. Particularly important are those compounds having the foregoing structure in which Ar designates an aromatic carbocyclic group having up to two rings and up to 12 carbon atoms and preferably containing one, two, or three halogen atoms, particularly chlorine or bromine, in the meta and/or para position with respect to the nitrogen atom to which the aromatic carbocyclic group is attached (i.e., in a position non-vicinal to the nitrogen atom), or containing an alkyl group having up to 5 carbon atoms, the halogen atoms or alkyl groups being substituted in the ring which is directly attached to the ring nitrogen atom of the triazine ring. Those compounds in which $R_2$ represents hydrogen or lower alkyl groups containing up to 6 carbon atoms or a phenyl group are also particularly important.

The compounds made by the method of the present invention may exist either in the form of salts (either one or two molecules of monobasic acid, for example, being present for each molecule of the dihydrotriazine free base in the salt), or they may exist in the form of the dihydrotriazine free bases. Normally, the salts are first obtained by the method of the present invention and the salt may be readily converted to the corresponding free base by careful neutralization, the neutralization preferably being carried out at room temperature or lower.

Both the dihydrotriazine salts and the corresponding free bases exhibit in many cases marked activity against experimental avian and rodent malaria, rodent toxoplasmosis, and avian coccidiosis, as well as anti-vitamin activity in microbiological systems. In general, it has been found that activity of the compounds is enhanced by the presence of halogen atoms in the meta and/or para positions of the aromatic ring which is attached directly to the ring nitrogen (i.e., in a position non-vicinal to the carbon-nitrogen bond). Such activity is also enhanced by the presence of two alkyl groups at the 2-position of the triazine ring, containing a total of 2 to 4 carbon atoms, or by the presence of a cycloalkylene group containing 4 carbon atoms. The presence of substituent groups in the ortho position of the aromatic carbocyclic group designated Ar, as well as the presence of acid substituents, such as carboxy or sulfo groups, in the para position in that aromatic carbocyclic group and the presence of large cycloalkylene groups in the 2-position of the triazine ring, tend to reduce the activity of the compound.

In one embodiment of the invention, a primary aromatic amine is reacted with a dicyandiamide and with an aldehyde to give products having the following structural formula:

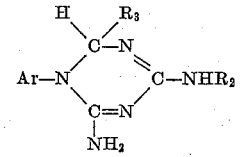

in which Ar represents the aromatic carbocyclic group corresponding to that represented by the same symbol in the generic formula for the dihydrotriazine given above, in which $R_2$ represents a group corresponding to that designated by the same symbol in the generic formula and $R_3$ represents an aromatic carbocyclic group having the connecting valence on a ring carbon atom. This aromatic carbocyclic group may contain one, two or three rings and may have up to 25 carbon atoms and may have one or more ring hydrogen atoms replaced by a monovalent substituent such as alkyl, alkoxy, carboxy, halo, sulfo, cyano, nitro, etc., groups. In the preferred compounds made by the present method, $R_3$ is an aromatic carbocyclic group of the benzene series having the connecting valence on a ring carbon atom and containing not more than two rings, preferably only one ring, and having a total of not more than 15 carbon atoms. This aromatic carbocyclic group may have one or more ring hydrogen atoms replaced by a monovalent substituent such as alkyl, alkoxy, carboxy, halo, sulfo, cyano, nitro, etc., groups, but preferably contains either no substituents other than hydrogen or contains as substituents only lower alkyl groups having up to 6 carbon atoms.

The primary aromatic amines which may be employed in this embodiment of the method of the present invention include those having the formula Ar—NH₂ in which Ar represents the aromatic carbocyclic group corresponding to that represented by the same symbol in the generic formula for the dihydrotriazine given above. A preferred class of amine starting materials comprises those having the structure

in which X represents a halogen atom and $n$ is an integer from 1 to 3. Preferably the halogen substituents are in positions non-vicinal to the carbon-nitrogen bond.

The dicyandiamide which may be employed to react with the amine and the aldehyde in the three-component synthesis possesses the following structural formula:

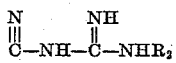

in which $R_2$ represents a group corresponding to that designated by the same symbol in the generic formula above. Preferably $R_2$ is hydrogen, a lower alkyl group containing up to 6 carbon atoms, or a phenyl group.

The aldehydes which may be employed to react with the arylamine and the dicyandiamide in this method are those having the structure $R_3$—CHO in which $R_3$ represents the same group as is designated by the symbol $R_3$ in the formula given above for the products of this synthesis. The method of this invention may also be employed with aldehydes having the structure $R_3$—CHO in which $R_3$ represents an aliphatic group, particularly an aliphatic hydrocarbon group, containing from 1 to 17 or more carbon atoms, preferably an alkyl group containing from 1 to 17 carbon atoms.

The relative proportions of arylamine, dicyandiamide, and aldehyde employed in carrying out the reaction of the present invention are not critical. However, the aldehyde is preferably employed in excess since it not only is generally the least expensive of the reagents but also may serve in some cases as a solvent or diluent medium for the reaction. In most cases it is also desirable to employ alcohol or the like as a reaction medium and in some cases water may be used in the reaction medium, although usually it is desirable to avoid the presence of water in order to obtain best results.

In order to achieve the desired products, it is essential that the reaction be carried out in the presence of a strong acid. The acids which have been found to be effective for this purpose are strong mineral acids such as sulfuric, nitric, hydrochloric, phosphoric, and the like, as well as the relatively strong organic acids such as picric, haloacetic such as bromacetic, and the like. In general, it has been found that only those acids having a dissociation constant ($K_a$) greater than about $5 \times 10^{-4}$ are effective. In the present method, acetic acid ($K_a = 1.8 \times 10^{-5}$) and formic acid ($K_a = 1.8 \times 10^{-4}$) are not effective, although bromacetic acid ($K_a = 1.4 \times 10^{-3}$) is effective.

As little as one-fourth equivalent of acid or even less for each mole of arylamine is sufficient. Because of the weak basicity of arylamines, the mono-acid salt of an arylamine with a sufficiently strong acid, as defined, provides a suitably low initial pH for the three-component synthesis to occur. If desired, the acid may be added in the form of the acid salt of the amine, although the reaction goes equally well if the free amine is employed as the starting material and the desired amount of a suitable strong acid is added. Under most conditions, the use of one equivalent of acid for each mole of amine is preferred, and although a larger excess may be used, it offers no particular advantage.

The amount of acid required may be measured in terms of pH by diluting the reaction mixture with 1000 volumes of water, then measuring the pH of the resulting diluted solution. It has been found that the pH of the reaction mixture diluted as described above may be up to about 5.5 with satisfactory results, but that when the pH of the diluted solution is as high as about 6.5, the reaction fails to yield the desired dihydrotriazines. Normally there is no advantage in having the pH of the diluted solution, determined as described above, less than about 2. This description of the amount of excess acid present and the pH of the reaction medium refers to conditions existing at the beginning of the reaction.

The temperature at which the reaction is carried out is in most cases not critical. In most cases the desired arylamine plus acid (or arylamine salt) is simply mixed with the dicyandiamide and the aldehyde together with ethanol or any other suitable solvent and heated at reflux temperature. This temperature may be as high as 120° C. or even higher. The reaction proceeds almost as well at room temperature, although the reaction is somewhat slower at the lower temperatures. In some cases it has been found that the reaction proceeds best at room temperature or even at lower temperatures down to 0° C. or lower, although the reaction is somewhat slower at lower temperatures. The time for the reaction may vary over a wide range, from minutes to days, depending upon the particular starting materials and reaction conditions employed.

When the reaction is carried out as described in the preceding paragraphs, there is formed the dihydrotriazine salt of the acid used in the reaction. In some cases the salt precipitates from the reaction medium and may be separated simply by filtration, but in other cases, particularly where the yield is lower, it may be necessary to evaporate the volatile portion of the reaction medium either in whole or in part in order to separate the product. The dihydrotriazine salts may readily be purified by recrystallization from suitable solvents such as water, ethanol, and the like. The salts exhibit characteristic ultraviolet absorption spectra which facilitate their identification. In general, the products are crystalline salt materials having relatively sharp melting points (with decomposition).

The corresponding dihydrotriazine free bases are readily formed simply by careful neutralization of a solution, preferably an aqueous solution, of the desired salt at moderate temperatures by means of sodium hydroxide, ammonia, or any other suitable alkaline reagent. The dihydrotriazine free bases are in general less stable than the corresponding acid salts, being readily rearranged simply by heating or by treatment with strong alkaline materials or both to form isomeric anilino dihydrotriazines, in which the nitrogen atom which is attached directly to the aromatic carbocyclic group Ar is not a part of the triazine ring, as follows:

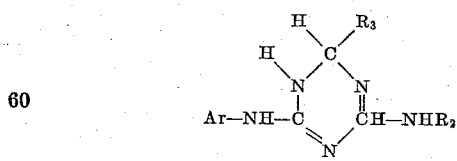

This molecular rearrangement appears to be irreversible since repeated efforts to reconvert the anilino compounds into the dihydrotriazines of the present invention in many ways, such as by treatment with acid under a variety of conditions, have been unsuccessful.

The following specific examples are given by way of illustration of this method of the invention and are not intended as a limitation upon the scope thereof.

*Example 1*

A mixture of 12.96 g. (0.1 mole) of aniline hydrochloride, 9 g. (0.107 mole) of dicyandiamide, 15.2 cc. (0.15 mole) of benzaldehyde, and 50 cc. of 95% ethanol was refluxed for six hours. On cooling, the clear, yellow-green solution deposited a colorless, crystalline material that was collected and washed with ethanol. The yield was 22.7 g. The melting point of a sample of the product—4,6-diamino-1,2-dihydro-1,2-diphenyl-s-triazine hydrochloride—recrystallized from water, was 215°–220° C.

*Example 2*

To a solution of 0.5 g. of the product of Example 1 in 20 cc. of water was added 1 cc. of concentrated ammonia. The crystals that slowly deposited were collected and washed with water, then with ethanol. The yield was 0.37 g. The product—4,6-diamino-1,2-dihydro-1,2-diphenyl-s-triazine—had a melting point of 158°–162° C.

*Example 3*

A mixture of 12.76 g. (0.1 mole) of p-chloroaniline, 9 g. (0.107 mole) of dicyandiamide, 8.3 cc. (0.1 mole) of concentrated hydrochloric acid, 15.2 cc. (0.15 mole) of benzaldehyde, and 50 cc. of 95% ethanol was refluxed for six hours. The clear, yellow solution deposited a crop of colorless crystals which was filtered off and washed with alcohol. Yield, 17.97 g. Crystallization from water gave a product—4,6-diamino-1-(p-chlorophenyl)-1,2-dihydro-2-phenyl-s-triazine hydrochloride—melting at 217°–221° C.

*Example 4*

A mixture of 12.76 g. (0.1 mole) of p-chloroaniline, 9 g. (0.107 mole) of dicyandiamide, 8.3 cc. (0.1 mole) of concentrated hydrochloric acid, 16.8 cc. (0.15 mole) of o-chlorobenzaldehyde, and 50 cc. of 95% ethanol was refluxed for ninety minutes. The clear, yellow solution deposited a crop of white crystals that was collected and washed with ethanol. Yield, 23.6 g. The compound—4,6-diamino-2-(o-chlorophenyl)-1-(p-chlorophenyl)-1,2-dihydro-s-triazine hydrochloride—on crystallization from water melted at 221°–224° C.

*Example 5*

A mixture of 12.76 g. (0.1 mole) of p-chloroaniline, 8.33 cc. (0.1 mole) of concentrated hydrochloric acid, 10.5 g. (0.1 mole) of $N^1$-methyldicyandiamide, and 15.3 cc. (0.15 mole) of benzaldehyde in 50 cc. of 95% ethanol was refluxed for six hours, and the clear yellow solution was refrigerated overnight. Since all efforts to induce crystallization failed, the reaction mixture was allowed to evaporate slowly in air at room temperature. After one month, manipulation of the glassy residue afforded colorless crystals of 4-methylamino-6-amino-1,2-dihydro-2-phenyl-1-(4'-chlorophenyl)-s-triazine hydrochloride, which were triturated with absolute ethanol and collected; yield, 6.9 g. (19%); M.P. 186°–194° C.

*Example 6*

A mixture of 11.16 g. (0.056 mole) of 3,4-dichloroaniline hydrochloride, 5.06 g. (0.06 mole) of dicyandiamide, 8.55 cc. (0.084 mole) of benzaldehyde, and 30 cc. of 95% ethanol was heated at reflux for five hours. The crystals of 4,6-diamino-1-(3',4'-dichlorophenyl)-1,2-dihydro-2-phenyl-s-triazine hydrochloride, which were deposited overnight, were collected, washed, and crystallized from water; yield, 4.1 g. (19.8%); M.P. 213°–217° C.

*Example 6A*

A mixture of 7.13 g. (0.02 mole) of p-chloroaniline picrate, 1.80 g. (0.0214 mole) of dicyandiamide, 3.4 cc. (0.06 mole) of acetaldehyde, and 40 cc. of 95% ethanol was allowed to stir at room temperature for about 2 hours. The crystals of 4,6-diamino-1-(p-chlorophenyl)-1,2-dihydro-2-methyl-s-triazine picrate which were deposited were collected, washed and dried; yield, 1.4 g. (15%); M.P. 243°–248° C.

All of the foregoing compounds, after suitable purification, gave analytical results corresponding closely to the values calculated for carbon, hydrogen, and nitrogen content.

*Example 7*

By following the same general procedure as outlined above, the following arylamines may be reacted with the indicated aldehydes and with dicyandiamide to give the dihydrotriazine salt. From the salt the dihydrotriazine free base may be prepared by the method of Example 2. For the sake of simplicity, the reagents and products are listed in tabular form. Although the products are named as the free bases, it will be understood that they are first produced in the form of the salt of whatever acid (having the proper acid strength) is employed in the reaction. In addition, salts of the free bases with other acids, including those acids insufficiently strong to be used in the reaction itself, such as acetic or carbonic, etc., may readily be prepared either directly from the free bases or in some cases by metathesis from the original acid salts produced by the reaction.

| Arylamine | Aldehyde | 1,2-Dihydro-s-triazine |
|---|---|---|
| 2,4-Dichloroaniline | Benzaldehyde | 4,6-Diamino-2-phenyl-1-(2',4'-dichlorophenyl)-. |
| 2,5-Dichloroaniline | do | 4,6-Diamino-2-phenyl-1-(2',5'-dichlorophenyl)-. |
| p-Chloroaniline | 1-Naphthyl-aldehyde | 4,6-Diamino-1-(4'-chlorophenyl)-2-(1-naphthyl)-. |
| 3,4,5-Trichloroaniline | p-Nitro-benzaldehyde | 4,6-Diamino-1-(3',4',5'-trichlorophenyl)-2-(p-nitrophenyl)-. |
| 3,4,5-Tribromoaniline | m-Bromo-benzaldehyde | 4,6-Diamino-1-(3',4',5'-tribromophenyl)-2-(m-bromophenyl)-. |
| 2-Aminophenanthrene | m-Tolualdehyde | 4,6-Diamino-1-(2'-phenanthryl)-2-(m-tolyl). |
| m-Chloroaniline | 2-Phenanthryl-aldehyde | 4,6-Diamino-1-(3'-chlorophenyl)-2-(2'-phenanthryl)-. |
| m-Bromoaniline | Benzaldehyde | 4,6-Diamino-2-phenyl-1-(3'-bromophenyl)-. |
| m-Iodoaniline | p-Tolualdehyde | 4,6-Diamino-1-(3'-iodophenyl)-2-(p-tolyl)-. |
| 3,4-Dichloroaniline | Acetaldehyde | 4,6-Diamino-1-(3',4'-dichlorophenyl)-2-methyl-. |
| Do | Propionaldehyde | 4,6-Diamino-1-(3',4'-dichlorophenyl)-2-ethyl-. |
| p-Anisidine | n-Butyraldehyde | 4,6-Diamino-1-(4'-methoxyphenyl)-2-(n-propyl)-. |
| p-Chloroaniline | i-Butyraldehyde | 4,6-Diamino-1-(p-chlorophenyl)-2-(i-propyl)-. |
| Do | n-Heptaldehyde | 4,6-Diamino-1-(p-chlorophenyl)-2-(n-hexyl)-. |
| 3,4-Dichloroaniline | n-Dodecylaldehyde | 4,6-Diamino-1-(3',4'-dichlorophenyl)-2-(n-undecyl). |
| p-Chloroaniline | do | 4,6-Diamino-1-(p-chlorophenyl)-2-(n-undecyl)-. |
| m-Chloroaniline | n-Tetradecyl-aldehyde | 4,6-Diamino-1-(m-chlorophenyl)-2-(n-tridecyl)-. |
| 3,4-Dichloroaniline | n-Stearaldehyde | 4,6-Diamino-1-(3',4'-dichlorophenyl)-2-(n-heptadecyl). |

Similarly, there may be substituted for the dicyandiamide in the foregoing examples $N^1$-methyldicyandiamide to give products which contain, instead of two amino groups (4,6-diamino), one amino group and one methylamino group (6-amino-4-methylamino) and which otherwise correspond to the dihydrotriazines listed above. Likewise, $N^1$-phenyldicyandiamide may be substituted for dicyandiamide to give the corresponding 6-amino-4-anilino-products, etc.

In another embodiment of the invention an aromatic primary amine is caused to react with a dicyandiamide and a ketone in the presence of acid to produce compounds having the following structural formula:

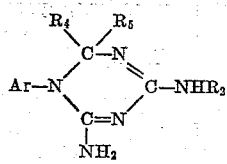

in which Ar represents the aromatic carbocyclic group corresponding to that represented by the same symbol in the generic formula for the dihydrotriazine given above, in which $R_2$ represents a group corresponding to that designated by the same symbol in the generic dihydrotriazine formula, and $R_4$ and $R_5$ represent either aliphatic groups which together contain up to 6 carbon atoms or aliphatic groups which together form an alicyclic ring containing up to 8 carbon atoms. In the preferred compounds made by the present method $R_4$ and $R_5$ are each aliphatic hydrocarbon groups such as alkyl groups containing together a total of 4 carbon atoms, or $R_4$ and $R_5$ are joined together to form an alicyclic hydrocarbon group containing up to 6 carbon atoms in the ring and free from any substituent groups.

The arylamines which may be employed in the present method include those having the structure Ar—$NH_2$ in which Ar represents the aromatic carbocyclic group corresponding to that represented by the same symbol in the generic formula for the dihydrotriazine. A preferred class of amine starting materials comprises those having the structure

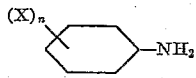

in which X represents a halogen atom and $n$ is an integer from 1 to 3. Preferably the halogen substituents are in positions non-vicinal to the carbon-nitrogen bond.

The dicyandiamide which may be employed in the present method has the following general structure

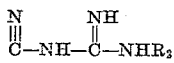

in which $R_2$ represents a group corresponding to that designated by the same symbol in the generic formula. Preferably $R_2$ is hydrogen, a lower alkyl group containing up to 6 carbon atoms, or a phenyl group.

The ketones which may be employed to react with the arylamine and the dicyandiamide in the present method are those having the structure $R_4$—CO—$R_5$ in which the symbols $R_4$ and $R_5$ represent groups corresponding to those designated by the same symbols in the dihydrotriazine formula above.

The relative proportions of arylamine, dicyandiamide, and ketone employed in carrying out the reaction according to the present embodiment are not critical. However, the ketone is preferably employed in excess since it not only is generally the least expensive of the reagents, but also serves in many cases as a solvent or diluent medium for the reaction. In many cases it is also desirable to employ alcohol or the like as a reaction medium, and in some cases it is desirable to employ some water in the reaction medium, although normally it is desirable to avoid the presence of water in order to obtain best results.

In order to achieve the desired products, it is essential that the reaction be carried out under the same conditions of acidity as are required in the three-component aldehyde synthesis described above. The temperature conditions and the time required for the present method are also generally the same as in the case of the three-component aldehyde synthesis. Similarly, the product is synthesized in salt form and is separated and purified in the same manner as other dihydrotriazines hereinbefore described.

The following specific examples are given by way of illustration of the present embodiment of the invention and are not intended as a limitation upon the scope thereof.

*Example 8*

A mixture of 48 g. (0.29 mole) of ethyl-p-aminobenzoate, 25.7 g. (0.31 mole) of dicyandiamide, 24.2 cc. (0.29 mole) of concentrated hydrochloric acid, and 150 cc. of acetone was refluxed with stirring for twenty-four hours. On standing, the reaction mixture, a clear yellow solution, deposited a crop of well-formed colorless crystals, which were filtered out and washed with acetone. The weight of the dry crystals was 26.2 g. On recrystallization from water, then from 95% ethanol, the melting point of the compound—4,6 - diamino - 1 - (p - carbethoxyphenyl) - 1,2 - dihydro - 2,2 - dimethyl - s - triazine hydrochloride—was found to be 189°–191° C.

*Example 9*

A mixture of 25.51 g. (0.2 mole) of p-chloro-aniline, 18 g. (0.214 mole) of dicyandiamide, 16.7 cc. (0.2 mole) of concentrated hydrochloric acid, and 103 cc. of acetone was refluxed with stirring, a clear brown solution being obtained initially. Within about seventeen hours, there had accumulated a fine, crystalline, white solid, which was collected and washed with acetone. The yield was 46.47 g. The product—4,6 - diamino - 1 - (p - chlorophenyl) - 1,2 - dihydro - 2,2 - dimethyl - s - triazine hydrochloride—after being crystallized twice from water was found to have a melting point of 210°–215° C.

*Example 9A*

Neutralization of the product with barium hydroxide affords the corresponding base—4,6 - diamino - 1 - (p-chlorophenyl) - 1,2 - dihydro - 2,2 - dimethyl - s - triazine—melting point 136°–144° C.

*Example 10*

A mixture of 18.22 cc. (18.63 g., 0.2 mole) of aniline, 18 g. (0.214 mole) of dicyandiamide, 16.7 cc. (0.2 mole) of concentrated hydrochloric acid, and 103 cc. of acetone was refluxed with stirring. Within seventeen hours a fine, crystalline, white solid had deposited from the clear orange solution. The crystals were collected and washed with acetone. Yield, 31.7 g. The compound—4,6 - diamino - 1,2 - dihydro - 2,2 - dimethyl - 1-phenyl - s- triazine hydrochloride—was recrystallized twice from water, and the melting point determined as 200°–203° C.

*Example 11*

A mixture of 12.96 g. (0.1 mole) of aniline hydrochloride, 9 g. (0.107 mole) of dicyandiamide, and 51.5 cc. of acetone was refluxed with stirring. A white crystalline solid began to deposit from the clear refluxing solution in about twenty minutes. After sixteen hours of reflux, the crystals were filtered off and washed with acetone. Yield, 22.4 g. The compound after being recrystallized from water showed a melting point of 200°–203° C. (Same product as in Example 10 above.)

*Example 12*

A mixture of 18.03 g. (0.1325 mole) of p-amino-benzamide, 11.93 g. (0.142 mole) of dicyandiamide, 10.6 cc. (0.1325 mole) of concentrated hydrochloric acid, 19.5 cc. (0.266 mole) of acetone, and 66.25 cc. of 95% ethanol was refluxed with stirring for eighteen hours, during which time a white crystalline solid separated out from the clear deep yellow solution. The crystals were collected and washed with ethanol. Yield, 18.23 g. A sample of the product—4,6 - diamino - 1 - (p - carboxamidophenyl) - 1,2 - dihydro - 2,2 - dimethyl -s - triazine hydrochloride—recrystallized from water showed a melting point of 210°–212° C.

*Example 13*

A mixture of 12.96 g. (0.1 mole) of aniline hydrochloride, 10.5 g. (0.107 mole) of N¹-methyldicyandiamide, and 51.5 cc. of acetone was refluxed with stirring for nineteen hours, during which time a white crystalline solid deposited. The crystals were collected and washed with acetone. Yield, 10.44 g. A sample of the product—6 - amino - 1,2 - dihydro - 2,2 - dimethyl - 4 - methylamino - 1 - phenyl - s - triazine hydrochloride—recrystallized from n-butanol showed a melting point of 170°–172° C.

*Example 14*

A mixture of 10.25 cc. (0.1 mole) of o-toluidine, 9 g. (0.107 mole) of dicyandiamide, 8.4 cc. (0.1 mole) of concentrated hydrochloric acid, and 103 cc. of acetone was refluxed with stirring for thirteen hours. The white crystalline solid—4,6 - diamino - 1,2 - dihydro - 2,2-dimethyl - 1 - (o - tolyl) - s - triazine hydrochloride—was collected, washed with ethanol and recrystallized from water. Yield, 18.39 g.; M.P. 224°–226° C.

*Example 15*

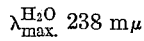

A mixture of 12.76 g. (0.1 mole) of p-chloro-aniline, 9 g. (0.107 mole) of dicyandiamide, 8.4 cc. (0.1 mole) of concentrated hydrochloric acid, 15.53 cc. (0.15 mole) of cyclohexanone, and 50 cc. of 95% ethanol was refluxed for eighteen hours. On cooling, the clear orange solution deposited white crystals in a yield of 7.82 g. The compound—4,6 - diamino - 1 - (p - chlorophenyl) - 1,2 - dihydro - 2,2 - pentamethylene - s - triazine hydrochloride—recrystallized from water, had a melting point of 224°–226° C.

*Example 16*

A mixture of 6.91 g. (0.05 mole) of p-nitro-aniline, 4.2 cc. (0.05 mole) of concentrated hydrochloric acid, 4.2 g. (0.05 mole) of dicyandiamide, and 100 cc. of acetone was stirred at room temperature. The reaction mixture became a clear brownish solution within a few minutes, and crystalline material began to be deposited shortly thereafter. After six hours the reaction was stopped and the product—4,6 - diamino - 1,2 - dihydro - 2,2 - dimethyl - 1 -(4' - nitrophenyl) - s - triazine hydrochloride—was collected and washed with acetone. It was a very pale yellow, light sensitive solid; yield, 11.1 g. (74%); M.P. 227°–233° C.;

$\lambda_{max.}^{H_2O}$ 238 m$\mu$ turbidity with cuprammonium sulfate. The same material was obtained when this reaction was repeated at 5° C. It was apparent that this crude preparation was contaminated with some p-nitrophenylbiguanide hydrochloride, and, for purification, one gram of the crude product was shaken with 25 cc. of water for fifteen minutes and the suspension filtered free of a dark yellow solid, M.P. 259°–260° C.; brown precipitate with cuprammonium sulfate. On lyophilization of the clear yellow filtrate, a pale yellow solid was obtained; 0.82 g.; M.P. 211°–218° C.; faint turbidity with cuprammonium sulfate. When this partially purified material was treated by the same procedure of extraction with insufficient water and lyophilization, a very pale yellow microcrystalline product resulted; M.P. 202°–205° C.; no turbidity with cuprammonium sulfate;

$\lambda_{max.}^{H_2O}$ 240 m$\mu$

*Example 17*

A mixture of 6.38 g. (0.05 mole) of p-chloro-aniline, 4.2 cc. (0.05 mole) of concentrated hydrochloric acid, 4.5 g. (0.0535 mole) of dicyandiamide, 40 cc. of methyl ethyl ketone, and 10 cc. of absolute ethanol was stirred at room temperature and became a clear, greenish-yellow solution in three hours. The reaction was stopped after twenty-four hours, at which time a white crystalline product had formed. The reaction mixture was refrigerated overnight and the product—4,6 - diamino - 1,2 - dihydro - 2 - methyl - 2 - ethyl - 1 - (4' - chlorophenyl) - s - triazine hydrochloride—was collected and washed with methyl ethyl ketone; 8.38 g. (50%); M.P. 196°–201° C.

*Example 18*

A mixture of 4.05 g. (0.025 mole) of 3,4-dichloroaniline, 2.1 cc. (0.025 mole) of concentrated hydrochloric acid, 2.25 g. (0.027 mole) of dicyandiamide, and 25 cc. of acetone was refluxed with stirring for eighteen hours and cooled. The white crystalline product—4,6 - diamino-1-(3',4'-dichlorophenyl)-1,2-dihydro-2,2-dimethyl-s-triazine hydrochloride—was collected and washed; yield, 6.4 g. (63.4%). Crystallization from water afforded analytically pure material, melting at 207°–212° C.

*Example 19*

A mixture of 3.26 g. (0.02 mole) of p-chloroaniline hydrochloride and 1.8 g. (0.0214 mole) of dicyandiamide in 15 cc. of methyl n-propyl ketone and 4 cc. of absolute ethanol was stirred at room temperature for twenty-four hours; at no time was a complete solution observed. Filtration of the reaction mixture afforded 1.12 g. of starting material. The clear brown filtrate, on being refrigerated for three months, afforded 1.05 g. (17%) of colorless prisms of 4,6-diamino-1,2-dihydro-2-methyl - 2-n-propyl-1-(4'-chlorophenyl)-s-triazine hydrochloride, melting at 188°–192° C.

All of the foregoing compounds, after suitable purification, gave analytical results corresponding closely to the values calculated for carbon, hydrogen, and nitrogen content.

*Example 20*

Following the same general procedures as outlined above, the following arylamines may be reacted with dicyandiamide and with the indicated ketones to give the dihydrotriazine salt. From the salt the dihydrotriazine free base may be prepared by the method of Example 2 or 9A. For the sake of simplicity, the reagents and products are listed in tabular form. Although the products are named as the free bases, it will be understood that they are first produced in the form of the salt of whatever acid (having the proper acid strength) is employed in the reaction. In addition, salts of the free bases with other acids, including those acids insufficiently strong to be used in the reaction itself, such as acetic or carbonic, etc., may readily be prepared either directly from the free bases or in some cases by metathesis from the original acid salts produced by the reaction.

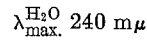

| Arylamine | Ketone | 1,2-Dihydro-s-triazine |
|---|---|---|
| p-Chloroaniline | Cyclopentanone | 4,6-Diamino-2,2-tetramethylene-1-(4'-chlorophenyl)-. |
| o-Toluidine | ---do--- | 4,6-Diamino-2,2-tetramethylene-1-(2'-tolyl)-. |
| Aniline | Diethyl ketone | 4,6-Diamino-2,2-diethyl-1-phenyl-. |
| p-Aminobenzoic acid | Acetone | 4,6-Diamino-2,2-dimethyl-1-(4'-carboxyphenyl)-. |
| p-Iodoaniline | ---do--- | 4,6-Diamino-2,2-dimethyl-1-(4'-iodophenyl)-. |
| p-Anisidine | Methyl ethyl ketone. | 4,6-Diamino-2-methyl-2-ethyl-1-(4'-anisyl)-. |
| m-Bromoaniline | Diethyl ketone | 4,6-Diamino-2,2-diethyl-1-(3'-bromophenyl)-. |
| m-Nitroaniline | Acetone | 4,6-Diamino-2,2-dimethyl-1-(3'-nitrophenyl)-. |
| 3,4-Xylidine | Cyclohexanone | 4,6-Diamino-2,2-pentamethylene-1-(3',4'-xylyl)-. |
| 3,4-Dimethoxyaniline | Acetone | 4,6-Diamino-2,2-dimethyl-1-(3',4'-dimethoxyphenyl)-. |
| p-Toluidine | ---do--- | 4,6-Diamino-2,2-dimethyl-1-(4'-tolyl)-. |
| p-Bromoaniline | ---do--- | 4,6-Diamino-2,2-dimethyl-1-(4'-bromophenyl)-. |
| o-Chloroaniline | ---do--- | 4,6-Diamino-2,2-dimethyl-1-(2'-chlorophenyl)-. |
| o-Bromoaniline | ---do--- | 4,6-Diamino-2,2-dimethyl-1-(2'-bromophenyl)-. |
| m-Chloroaniline | ---do--- | 4,6-Diamino-2,2-dimethyl-1-(3'-chlorophenyl)-. |
| 2,4-Dichloroaniline | ---do--- | 4,6-Diamino-2,2-dimethyl-1-(2',4'-dichlorophenyl)-. |
| 2,5-Dichloroaniline | ---do--- | 4,6-Diamino-2,2-dimethyl-1-(2',5'-dichlorophenyl)-. |

| Arylamine | Ketone | 1,2-Dihydro-s-triazine |
|---|---|---|
| 3,4-Dichloroaniline | Methyl ethyl ketone. | 4,6-Diamino-2-methyl-2-ethyl-1-(3',4'-dichlorophenyl)-. |
| 1-Naphthylamine | Acetone | 4,6-Diamino-2,2-dimethyl-1-(1'-naphthyl)-. |
| 2-Naphthylamine | do | 4,6-Diamino-2,2-dimethyl-1-(2'-naphthyl)-. |
| m-Toluidine | do | 4,6-Diamino-2,2-dimethyl-1-(3'-tolyl)-. |
| 2,6-Xylidine | do | 4,6-Diamino-2,2-dimethyl-1-(2',6'-xylyl)-. |
| o-Nitroaniline | do | 4,6-Diamino-2,2-dimethyl-1-(2'-nitrophenyl)-. |
| Aniline | Methyl ethyl ketone. | 4,6-Diamino-2-methyl-2-ethyl-1-phenyl-. |
| p-Anisidine | Acetone | 4,6-Diamino-2,2-dimethyl-1-(4'-anisyl)-. |
| p-Cyanoaniline | do | 4,6-Diamino-2,2-dimethyl-1-(4'-cyanophenyl)-. |
| o-Anisidine | do | 4,6-Diamino-2,2-dimethyl-1-(2'-anisyl)-. |
| p-Fluoroaniline | do | 4,6-Diamino-2,2-dimethyl-1-(4'-fluorophenyl)-. |
| o-Fluoroaniline | do | 4,6-Diamino-2,2-dimethyl-1-(2'-fluorophenyl)-. |
| p-Anilinesulfonic acid | do | 4,6-Diamino-2,2-dimethyl-1-(4'-sulfophenyl)-. |
| o-Iodoaniline | do | 4,6-Diamino-2,2-dimethyl-1-(2'-iodophenyl)-. |
| 3,4-Xylidine | do | 4,6-Diamino-2,2-dimethyl-1-(3',4'-xylyl)-. |
| 3,5-Dibromoaniline | do | 4,6-Diamino-2,2-dimethyl-1-(3',5'-dibromophenyl)-. |
| 1-Phenanthrylamine | do | 4,6-Diamino-2,2-dimethyl-1-(1'-phenanthryl)-. |
| m-Iodoaniline | do | 4,6-Diamino-2,2-dimethyl-1-(3'-iodophenyl)-. |

There may be substituted for the dicyandiamide in the foregoing examples $N^1$-methyldicyandiamide to give the corresponding 6-amino-4-methylamino-compounds, $N^1$-n-butyldicyandiamide to give the corresponding 6-amino-4-n-butylamino-compounds, $N^1$-phenyldicyandiamide to give the corresponding 6-amino-4-anilino-compounds, etc.

It should also be noted that the products prepared by the ketone synthesis differ from those prepared by the aldehyde synthesis only in that portion of the molecule which is derived from the ketone or aldehyde respectively. The remaining portions of the molecule in each case may be varied in the same way as to substituent groups by varying the aromatic amine and the dicyandiamide reactants.

It would obviously lengthen this specification unduly to record examples of all of the various modifications of the experimental procedures and reaction conditions that can be employed in carrying out the synthesis of the claimed compounds. Therefore, although only limited examples of the variation of said experimental reaction conditions are included in the working examples, it is to be clearly understood that my invention covers, to the extent indicated in the specification, a wide range of variation of the time and temperature of the reactions, the use of a particular acid of sufficient acid strength, the amount of acid used, and the method of workup of the reaction mixture and isolation of the product.

This application is a continuation-in-part of my co-pending applications Serial No. 264,344 and Serial No. 264,345, both filed December 31, 1951, and now abandoned.

Although specific embodiments of the invention have been described herein, it is not intended to limit the invention solely thereto, but to include all of the obvious variations and modifications within the spirit and scope of the appended claims.

I claim:
1. A compound having the following structure

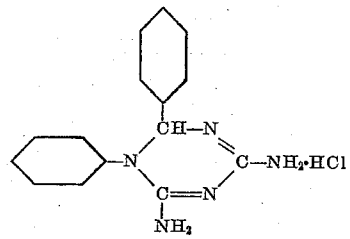

2. A compound having the following structure

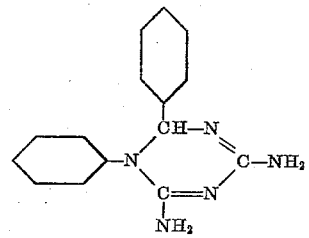

References Cited in the file of this patent
UNITED STATES PATENTS

| | | |
|---|---|---|
| 2,217,030 | Simons | Oct. 8, 1940 |
| 2,273,382 | Simons | Feb. 17, 1942 |
| 2,389,150 | Jayne | Nov. 20, 1945 |
| 2,515,116 | Dudley | July 11, 1950 |
| 2,517,824 | Appelquest | Aug. 8, 1950 |
| 2,541,005 | Oldham et al. | Feb. 6, 1951 |
| 2,621,102 | Nagy | Dec. 9, 1952 |
| 2,714,057 | Chenicek | July 26, 1955 |
| 2,803,628 | Crowther | Aug. 20, 1957 |
| 2,836,539 | Cutler | May 27, 1958 |